United States Patent
Kodo et al.

[11] Patent Number: 6,083,740
[45] Date of Patent: Jul. 4, 2000

[54] SYSTEM FOR PURIFYING A POLLUTED AIR BY USING ALGAE

[75] Inventors: Keiun Kodo; Yasumasa Kodo, both of Mino; Makoto Tsuruoka, Tondabayashi, all of Japan

[73] Assignee: Spirulina Biological Lab., Ltd., Osaka, Japan

[21] Appl. No.: 09/119,607

[22] Filed: Jul. 22, 1998

[30] Foreign Application Priority Data

Feb. 12, 1998 [JP] Japan .................................. 10-030249

[51] Int. Cl.[7] .................................................. B01D 53/84
[52] U.S. Cl. .................. 435/266; 435/257.1; 435/292.1; 47/1.4
[58] Field of Search ................................ 435/257.1, 266, 435/292.1, 293.1; 47/1.4

[56] References Cited

U.S. PATENT DOCUMENTS

| | | |
|---|---|---|
| 3,224,143 | 12/1965 | Tew et al. . |
| 3,955,318 | 5/1976 | Hulls . |
| 3,959,923 | 6/1976 | Selke . |
| 4,446,236 | 5/1984 | Clyde . |
| 5,614,378 | 3/1997 | Yang et al. . |
| 5,741,702 | 4/1998 | Lorenz . |

FOREIGN PATENT DOCUMENTS

| | | |
|---|---|---|
| 0 442 157 | 9/1991 | European Pat. Off. . |
| 36 07 864 | 9/1986 | Germany . |
| 3607864 | 9/1986 | Germany . |
| 5-23541 | 2/1993 | Japan . |
| 7-204463 | 8/1995 | Japan . |
| 8-206434 | 8/1996 | Japan . |
| 9-136015 | 5/1997 | Japan . |
| 98/22201 | 5/1998 | WIPO . |

OTHER PUBLICATIONS

Abstract of EP–749773 (Aug. 1996).
Patent Abstracts of Japan, vol. 96, No. 12, Dec. 26, 1996 & JP 08–206434 (Japan Ecological Kaunseru, Aug. 13, 1996.

*Primary Examiner*—William H. Beisner
*Attorney, Agent, or Firm*—Arent Fox Kintner Plotkin & Kahn

[57] ABSTRACT

A system for purifying a polluted air by using algae such as Spirulina is capable of reducing carbon dioxide ($CO_2$), nitrogen oxide ($NO_x$) and/or sulfur oxide ($SO_x$) in the polluted air and generating oxygen. That is, this system comprises a culture tank filled with a culture fluid including the algae, an air supply unit for forcing the polluted air into the culture fluid to dissolve carbon dioxide and nitrogen oxide and/or sulfur oxide in the culture fluid, and a lighting unit for radiating a light to the culture fluid. By radiating the light to the culture fluid in the presence of carbon dioxide, photosynthesis of the algae is promoted to convert carbon dioxide into oxygen. In addition, the algae use the nitrogen oxide and/or sulfur oxide as a nutrient during the photosynthesis. As a result, the present system can efficiently purify the polluted air to generate a purified air, which is rich in oxygen.

7 Claims, 2 Drawing Sheets

SYSTEM FOR PURIFYING A POLLUTED AIR BY USING ALGAE

BACKGROUND OF THE INVENTION

1. Field of the Invention

The present invention relates to a system for purifying a polluted air including carbon dioxide, nitrogen oxide and/or sulfur oxide by using algae such as Spirulina. This system can be used to provide a purified air to multipurpose facilities such as theater, department store, super market, hotel, conference hall, hospital, bank, office building, subway station, and underground shopping center.

2. Disclosure of the Prior Art

In recent years, air pollution caused by exhausts from thermal power plants, automobiles and so on is becoming serious in every country of the world. The exhausts usually contain poisonous gas components to the human body, for example, sulfur dioxide ($SO_2$), nitrogen oxide ($NO_x$) and carbon monoxide (CO). In particular, nitrogen oxide is very poisonous to the human body, and gives a bad influence to nasal cavity, throat, trachea, bronchiole, alveolus, and blood vessels. In addition, it is known that nitrogen oxide gas induces a photochemical smog under a weather condition. Since the nitrogen oxide gas has a relatively large specific gravity, it is said that the air pollution is more serious in the underground shopping center or subway station. In particular, when a heavy traffic density of cars occurs at roads built above subway, the air around the roads is badly polluted by the exhausts of automobiles. The quality of air in the subway station is getting increasingly worse by the badly polluted air flowing from the outside into the subway. In fact, diseases such as allergic disease, atopic dermatitis, asthma, lung cancer, and stomatitis increase in city areas. It is said that the air pollution is one of causes of these diseases. By a conventional filtration, dust can be removed from the polluted air flowing into the underground facilities. However, it is very difficult to remove $NO_x$ and $SO_x$ gas components from the polluted air by the filtration.

In addition, crowd gathers in multipurpose facilities such as theater, department store, super market, hotel, conference hall, hospital, bank, office building, subway station, and underground shopping center. As oxygen is consumed in the facilities, the concentration of $CO_2$ in the air relatively increases. This gives fatigue or unpleasant feeling to people utilizing the facilities.

By the way, increasing $CO_2$ is a worldwide problem as it is considered to be a main cause of global warming. The concentration of $CO_2$ in the air was 270 ppm at the time of Industrial Revolution. Now, it has increased up to 350 ppm as a result of increasing use of fossil fuel. This means 130% increase during about 200 years. In general, it is regarded that 31% of the entire $CO_2$ sources come from thermal power plants, 17% from transportation such as automobiles, and 12% from public utility excluding electricity (e.g. town gas). According to some research, the concentration of $CO_2$ would double and average temperature would rise by 1.5–3.0 degrees by the year 2030 if $CO_2$ continues to increase at the present pace.

In the past, an air purifying system for removing suspended particles of dust by a filter, or ionizing and adsorbing the suspended particles of dust has been proposed. It is also proposed to adsorb bad-smell components in the air by using an activated carbon layer. However, $NO_x$ and $SO_x$ gas components can not be substantially removed from the polluted air by these systems.

Thus, it is desired to provide a system for efficiently purifying a polluted air including carbon dioxide, nitrogen oxide, and/or sulfur oxide. However, an epoch-making means of satisfying the demand has not been proposed yet.

SUMMARY OF THE INVENTION

A primary object of the present invention is to provide a system for purifying a polluted air by using algae, which is capable of reducing carbon dioxide ($CO_2$), nitrogen oxide ($NO_x$) and/or sulfur oxide ($SO_x$) from the polluted air and generating oxygen. That is, this system comprises a culture tank filled with a culture fluid including the algae, an air supply unit for forcing the polluted air into the culture fluid to dissolve carbon dioxide and nitrogen oxide and/or sulfur oxide in the culture fluid, and a lighting unit for radiating a light to the culture fluid. By radiating the light to the culture fluid in the presence of carbon dioxide, photosynthesis of the algae is promoted to convert carbon dioxide to oxygen. In addition, the algae use the nitrogen oxide and/or sulfur oxide as a nutrient during the photosynthesis to generate a purified air, which is rich in oxygen. In the present system, it is possible to continuously perform the air purifying operation a whole day by using the lighting unit.

It is particularly preferred to use Spirulina as the algae.

It is also preferred that the system comprises a unit for removing the algae having a predetermined size, e.g., 300 $\mu$m or more from the culture fluid. As the algae grow in the culture fluid, a light transmittance of the culture fluid becomes poor. As a result, the grown algae may prevent the photosynthesis of the algae. Therefore, it is preferred to intermittently remove the grown algae from the culture fluid by the removing unit. In case of using Spirulina as the algae, grown Spirulina harvested from the culture fluid can be used as foods or feeds.

Another object of the present invention is to provide an apparatus for generating a purified air from a polluted air including carbon dioxide and at least one of nitrogen oxide and sulfur oxide by using algae. This apparatus comprises a culture tank filled with a culture fluid including the algae such as Spirulina. The culture tank has an inlet for receiving a supply of the culture fluid, outlet for draining the culture fluid, and at least one air vent for escaping the purified air from the culture tank. The apparatus comprises an air supply unit for forcing the polluted air into the culture fluid to dissolve carbon dioxide, nitrogen oxide and/or sulfur oxide in the culture fluid. A lighting unit is disposed in the culture tank to radiate a light to the culture fluid to promote photosynthesis of the algae in the presence of carbon dioxide by the use of nitrogen oxide and/or sulfur oxide as a nutrient of the algae, to thereby provide a reduction of nitrogen oxide and/or sulfur oxide and generation of oxygen. A return line is formed outside of the culture tank to extend from the outlet to the inlet of the culture tank. The apparatus also comprises a pump for making a circulation flow of the culture fluid such that the culture fluid drained from the outlet is returned to the inlet of the culture tank through the return line, and a filter for removing the algae having a predetermined size or more from the culture fluid and returning a filtrate including immature algae to the culture tank.

In this apparatus, it is preferred that the culture tank is provided with a plurality of partitions which forms a meander line in the culture tank. In particular, it is preferred that the partitions consist of at least one first partition projecting on a bottom of the culture tank and at least one second partition hanging from a top of the culture tank, which are alternately arranged to make the meander line. In addition, it is preferred that the lighting means is disposed along the meander line in the culture tank.

A further object of the present invention is to provide a method of purifying a polluted air containing carbon dioxide and at least one of nitrogen oxide and sulfur oxide by using algae. That is, the method comprises the step of forcing the polluted air into the culture fluid to dissolve carbon dioxide and at least one of nitrogen oxide and sulfur oxide in the culture fluid, and radiating a light to the culture fluid to promote photosynthesis of the algae in the presence of carbon dioxide by the use of nitrogen oxide and/or sulfur oxide as a nutrient of the algae, to thereby provide a reduction of nitrogen oxide and/or sulfur oxide and generation of oxygen.

These and still other objects and advantages will become apparent from the following detail descriptions of the preferred embodiment and example of the invention when taken in conjunction with the attached drawings.

DETAIL DESCRIPTION OF THE PREFERRED EMBODIMENTS

Figure 1:
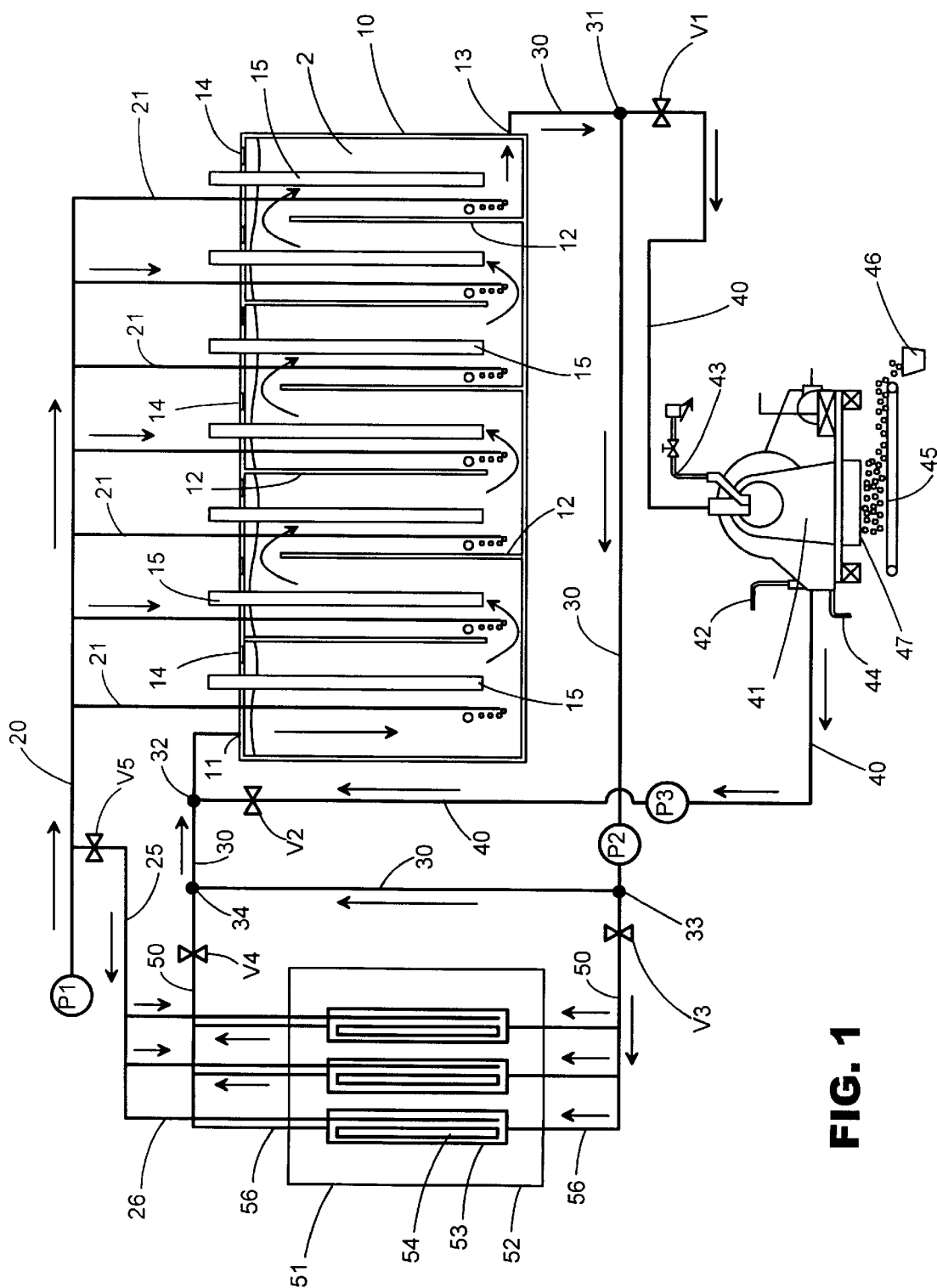
FIG. 1 is a schematic of an apparatus for generating a purified air from a polluted air by using Spirulina as a first preferred embodiment of the present invention.

A first embodiment of an air purifying apparatus of the present invention is explained in detail. As shown in FIG. 1, the apparatus of the present invention comprises a culture tank 10, first and second air supply lines 20, 25, return line 30, harvest line 40, and a display line 50.

The culture tank 10 is filled with a culture fluid 2 including Spirulina as algae. The culture tank 10 has an inlet 11 for receiving a supply of the culture fluid, a plurality of partitions 12, and an outlet 13 for draining the culture fluid. The partitions 12 consist of first partitions projecting on a bottom of the culture tank 10 and second partitions hanging from a top of the culture tank, which are alternately arranged to make a meander line in the culture tank. The culture fluid 2 can flow from the inlet 11 to the outlet 13 through the meander line in the culture tank 10, as shown in FIG. 1. This meander line provides an extended flow line of the culture fluid greater than the length of the culture tank 10.

As a lighting unit for radiating an artificial light to the culture fluid 2, a plurality of fluorescent lamps 15 are disposed in the culture tank 10 such that each of the fluorescent lamps substantially extends along the partition 12. By the arrangements of the partitions 12 and the fluorescent lamps 15 in the culture tank 10, it is possible to efficiently provide a sufficient amount of light to the culture fluid flowing in the meander line. It is preferred that the lighting unit is capable of radiating the light having a light amount of 1000 to 8000 lux. In particular, it is preferred that the lighting unit is capable of radiating the light having a wavelength of 400 to 700 $\mu$m and a light amount of 4000 to 5000 lux. In place of the fluorescent lamps, a light emitting diode, high-pressure sodium lamp, fluorescent mercury lamp, or sunlamp may be used.

If necessary, it is preferred to use at least one optical fiber bundle (not shown) for supplying sunlight to the culture fluid in the culture tank 10. The optical fiber bundle is usually formed with 50 to 100 optical fibers. The optical fibers have different lengths so that sunlight-radiation ends of the optical fibers are uniformly distributed with respect to the depth direction of the culture tank. For example, when it is a clear day providing a sufficient amount of sunlight, only sunlight may be radiated to the culture fluid through the optical fiber bundle. On the other hand, when it is a cloudy day or rainy day, which can not provide a sufficient amount of sunlight, both of sunlight and the artificial light of the fluorescent lamps may be radiated to the culture fluid. Needless to say, only the artificial light is used for the air purifying operation during the nighttime.

A polluted air including sulfur dioxide gas ($SO_2$) and/or nitrogen oxide gas ($NO_x$) is forced into the culture fluid 2 by a pump P1 through the first supply line 20. The first supply line 20 comprises a plurality of sub lines 21, each of which is inserted to the culture tank 10 such that an ejection end of the sub line is disposed at the vicinity of the bottom of the culture tank 10. The polluted air supplied from the ejection ends of the sub lines 21 is purified by the algae in the culture fluid, so that a purified air comes from the surface of the culture fluid. Air vents 14 are formed in the top of the culture tank 10. The purified air is collected through the air vents 14, and then sent to a desired space through a ventilation unit or air-conditioner (not shown).

The return line 30 of the culture fluid 2 is formed outside of the culture tank 10 to extend from the outlet 13 to the inlet 11. A pump P2 is disposed in the return line 30 to make a circulation flow of the culture fluid 2 such that the culture fluid drained from the outlet 13 is returned to the inlet 11 of the culture tank through the return line 30.

The harvest line 40 is used to remove grown algae from the culture fluid 2. The harvest line 40 extends from a first portion 31 to a second portion 32 of the return line 30. The harvest line 40 has a filter unit 41 for removing the grown algae having a predetermined size or more from the culture fluid 2, a first valve V1 disposed between the first portion 31 and the filter unit 41, a second valve V2 disposed between the filter unit 41 and the second portion 32, and a pump P3 for making a flow of the culture fluid 2 in the harvest line. For example, the filter unit 41 can remove the algae having a size of 300 $\mu$m or more from the culture fluid, and return a filtrate having immature algae having a size less than 300 $\mu$m to the culture tank 10. As the filter unit 41, it is possible to use a DE-CONE type centrifugal separator (manufactured by TANABE Ironworks Co., Ltd.), Fast Decanter (manufactured by TANABE WILTECK Co., Ltd.), vibration screen, or a belt filter. In FIG. 1, numeral 45 designates a conveyer for transporting the grown algae removed by the filter unit 41 to a vessel 46. Numerals 42, 43, and 44 designate an air hole, supply pipe of water for cleaning, and an exhaust pipe of water for cleaning, respectively. Numeral 47 designates an exhaust gate of the filter unit 41, through which the grown algae is supplied to the conveyer 45.

The display line 50 extends from a third portion 33 to a fourth portion 34 of the return line 30. The display line 50 has a display tank 51, a third valve V3 disposed between the third portion 33 and the display tank 51, and a fourth valve V4 disposed between the display tank 51 and the fourth portion 34. The display tank 51 is formed with an outer transparent case 52, a plurality of inner transparent cases 53 disposed in the outer case, and lighting units 54 incorporated in the inner cases. The display line 50 has a plurality of sub display lines 56 branched at the downstream of the third valve V3. After the sub display lines 56 pass through the inner cases 53, they are collected again to the display line 50 at the upstream of the fourth valve V4. The polluted air is supplied to the inner cases 53 by the pump P1 through the second supply line 25. The second supply line 25 is branched from the first supply line 20, and has a plurality of sub lines 26 to force the polluted air into the culture fluid 2 in the inner cases 53. The symbol V5 designates an air valve disposed in the second supply line 25.

A transmission light provided from the lighting unit 54 to the outside of the display tank 51 through the culture fluid 2 can be used as a fantastic and dreamy illumination. For example, when the display tank is disposed at underground shopping center, subway station, department store, and so on, it may present a relaxation space to guests and improve working conditions of workers in those facilities. On the other hand, when the display tank is disposed in hospital, it may promote the healing of patients. In addition, since the photosynthesis is an endothermic reaction, it is possible to reduce a temperature of the purified air. This would be useful to save energy required for air cooling in the facilities.

Next, a method of purifying the polluted air by using the above-described apparatus is explained. By operating the pump P2, the culture fluid 2 flows in the return line 30 to make a meandering stream of the culture fluid in the culture tank 10. In addition, the valves V3, V4 are opened to send a part of the culture fluid 2 flowing in the return line 30 to the display line 50. After the culture fluid 2 passes through the display tank 51, it is returned to the return line 30 through the valve V4. A polluted air including a high concentration of carbon dioxide ($CO_2$) and sulfur oxide gas ($SO_x$) and nitrogen oxide gas ($NO_x$) is forced into the culture fluid 2 of the culture tank 10 through the first supply line 20 by the air pump P1. The $NO_x$ gas is dissolved as water-soluble compounds such as $NaNO_2$ and $NaNO_3$ in the culture fluid. The $SO_x$ gas is dissolved as water-soluble compounds such as $(NH_4)_2SO_4$ in the culture fluid. The polluted air is also forced into the culture fluid 2 of the display tank 51 through the second supply line 25 by the air pump P1. In this case, the air valve V5 is opened. The culture fluid 2 in the culture tank 10 is exposed to the light of the lighting units 15. Similarly, the culture fluid in the display tank 51 is exposed to the light of the lighting units 54.

Spirulina carries out photosynthesis by using the light radiated from the lighting units in the presence of carbon dioxide gas of the polluted air supplied to the culture fluid 2. In addition, Spirulina uses those water-soluble compounds as nutrients during the photosynthesis. The photosynthesis of Spirulina proceeds in the culture tank 10 and the display tank 51. As a result, Spirulina generates oxygen and synthesizes glycogen, amino acids and glycoside. Thus, the polluted air is purified by the photosynthesis of Spirulina. The purified air including oxygen is collected through the air vents 14, and then sent to a desired room through the ventilation unit (not shown).

After the elapse of a culturing time of Spirulina, the valves V1, V2 are opened to send a part of the culture fluid 2 flowing in the return line 30 to the harvest line 40. In this time, the pump P3 is operated to make a flow of the culture fluid 2 in the harvest line 40. A grown Spirulina having a size of 300 μm or more is removed from the culture fluid by the filter unit 41, and a filtrate including an immature Spirulina is returned to the culture tank 10 through the harvest line 40. After the harvesting operation of the grown Spirulina is finished, the valves V1, V2 are closed. Since the grown Spirulina lowers a light transmittance of the culture fluid in the culture tank 10, there is a possibility of preventing the photosynthesis of the algae. Therefore, it is preferred to intermittently remove the grown algae from the culture fluid 2 by the filter unit 41. Thus, this harvest line is useful to provide a stable air purifying operation of the polluted air.

It has been confirmed that the air purifying apparatus of the present invention can provide a harvest amount of 12 g/$m^2$ a day of Spirulina, which is equal to about 50 times of the harvest amount in the natural lake. In particular, when the apparatus is operated a whole day by radiating the artificial light of the fluorescent lamps to the culture fluid during the nighttime, the harvest amount of Spirulina reaches 20 to 30 g/$m^2$ a day. On the other hand, the present apparatus can provide 2 cc/sec of an oxygen generation capability when a Spirulina concentration of the culture fluid is about 0.5 g/L. It is preferred that an upper limit of the Spirulina concentration in the culture fluid is about 1.3 g/L.

Figure 2:
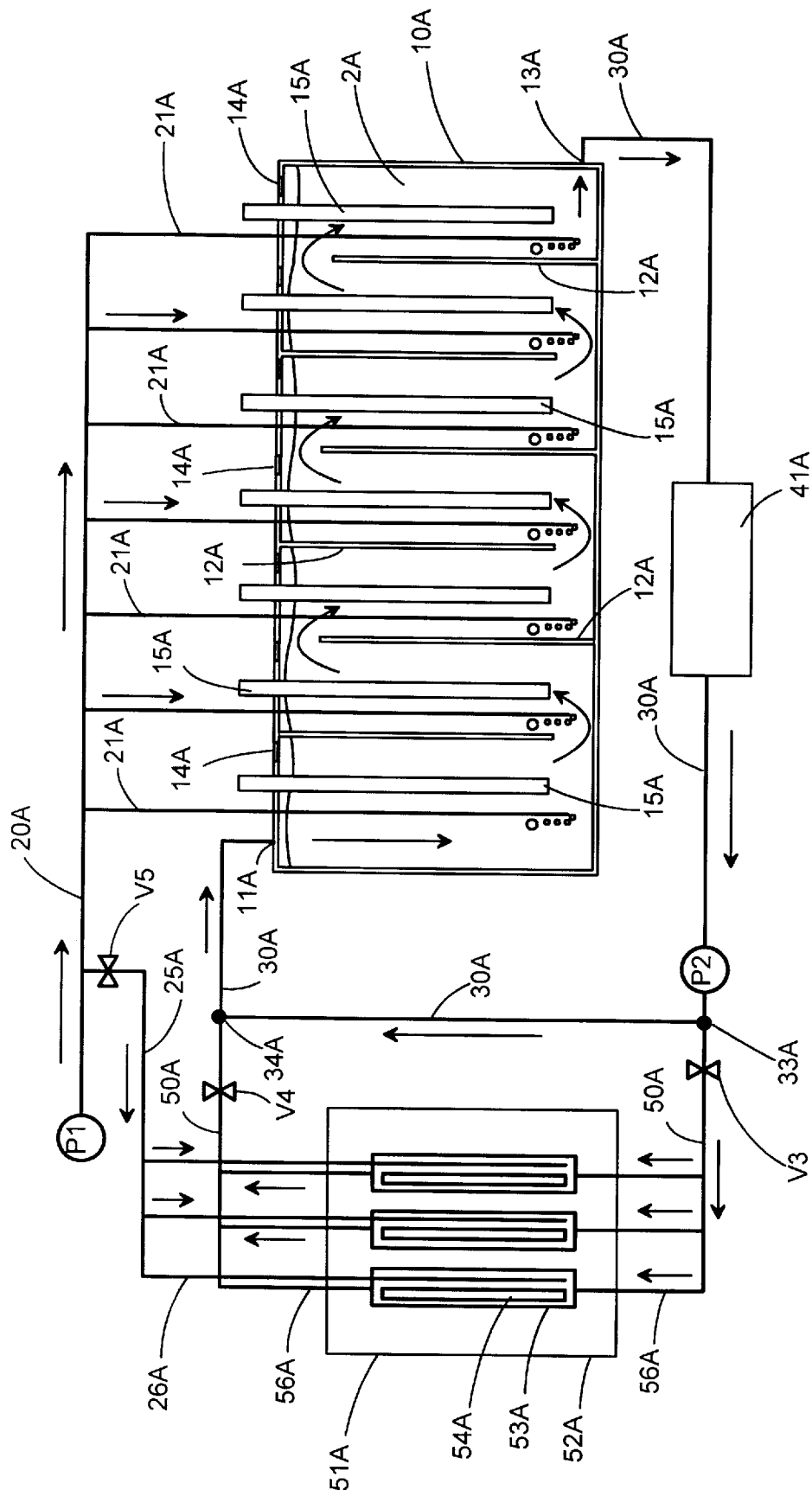
FIG. 2 is a schematic of an apparatus for generating a purified air from a polluted air by using Spirulina as a second preferred embodiment of the present invention.

A second embodiment of an air purifying apparatus of the present invention is substantially the same as the first embodiment except that a harvest line is omitted, as shown in FIG. 2. Therefore, no duplicate explanation to common parts is deemed necessary. Like parts are designated by numerals with a suffixed letter of "A". A filter unit 41A is disposed on a return line 30A between a pump P2 and an outlet 13A of a culture tank 10A. For example, the filter unit can be operated according to the following manner. During a predetermined culturing time of Spirulina, the filter unit 41A is not operated to pass a culture fluid 2A in the return line 30A without the filtration. After the elapse of the culturing time, the filter unit 41A is operated to remove the grown Spirulina having a predetermined size or more from the culture fluid and return a filtrate including immature Spilurina to the culture tank 10A. It is also possible to continuously operate the filter unit 41A during the air purifying operation. In the second embodiment, since the pump P3 and valves V1 and V2 disposed in the harvest line 40 of the first embodiment are omitted, it is possible to provide an air purifying apparatus with a simple design thereof and good cost-effectiveness.

By the away, it is preferred to use Spirulina or Euglena as the algae in the present invention. In particular, it is preferred to use Spirulina. Spirulina is a kind of blue-green algae living at salt lakes in the tropical regions, and is excellent in the resistance to ultraviolet. For example, it is well known that Spirulina lives in the Chad Lake of the Republic of Chad located at the Sahara Desert of Africa. Tribes living around the Chad Lake have ingested Spirulina as a protein source from time immemorial. The protein of Spirulina is composed of a lot of amino acids essential to the human body, and richly contains minerals and nutrient substances except for vitamin C. Thus, Spirulina is drawing public attention as a nutrition-supplementary food for keeping human health. A growth rate of Spirulina is about 130% a day. Due to this advantage, Spirulina is expected as one means for solving the food problem of the earth.

Spirulina efficiently generates oxygen during the photosynthesis. It is said that the oxygen generation amount of Spirulina is twenty times or more than that of general plants. In addition, Spirulina converts $CO_2$ in a polluted air into $O_2$ and uses $NO_x$ and $SO_x$ gas components in the polluted gas as nutrients during the photosynthesis. This promotes the oxygen generation of Spirulina. When Spirulina is used as the algae in the present apparatus, there are advantages of purifying the polluted air and also producing the food.

Spirulina is an autotroph. Therefore, Spirulina can increase with only the use of water, nitrogen and carbon dioxide in nature. However, it is preferred to use a culture fluid including the algae and an alkali aqueous solution to improve a culturing efficiency of the algae. For example, a mixture of Spirulina and one of compositions S1 to S3 listed in Table 1 may be used as the culture fluid.

TABLE 1

| Composition | S1 | S2 | S3 |
|---|---|---|---|
| $KNO_3$ | 3.0 | — | — |
| $NaNO_3$ | — | 2.5 | 1.5 |
| $K_2HPO_4$ | 1.0 | 0.5 | 0.5 |
| $K_2SO_4$ | 1.0 | 1.0 | 1.0 |
| $NaHCO_3$ | 16.0 | 16.8 | 4.5 |
| NaCl | 1.5 | 1.0 | 1.0 |
| $NH_4CO_3$ | 1.0 | 1.0 | 1.0 |
| $MgSO_4.7H_2O$ | 0.02 | 0.2 | 0.2 |
| $CaCl_2.2H_2O$ | 0.04 | 0.04 | 0.04 |
| EDTA.2Na | 0.064 | 0.08 | — |
| $FeSO_4.7H_2O$ | 0.008 | 0.01 | 0.01 |
| $Na_2SO_4.10H_2O$ | 3.5 | — | — |
| Ferric Citrate | 0.012 | — | — |
| Water | 1000.0 | 1000.0 | 1000.0 |

(Unit: parts by weight)

An amount of Spirulina in the culture fluid may be 0.05 to 0.5 g/L(liter). It is preferred to keep a temperature of the culture fluid within a range of 20° C. to 45° C. and more preferably 30° C. to 40° C. If necessary, a heater for warming the culture fluid can be disposed in the culture tank 10. Alternatively, stick-type heater may be inserted into the culture fluid of the culture tank. It is preferred to determine a pH value of the culture fluid within a range of 8.5 to 11. In particular, it is preferred that the pH value of the culture fluid is 10.5. When a salt water is used as the culture fluid, it is preferred to determine the concentration within a range of 0.05% to 2.0%, and more preferably 0.05% to 0.2%. As the concentration of the salt water is higher, it is possible to readily prevent an increase of various germs in the culture fluid. From economical viewpoint, an adequate concentration of the salt water is about 0.1%.

EXAMPLE

Table 2 is an extract from "The Present Situation of Air Pollution on Roads" supervised by the Environment Agency of Japan (published on December 1996). As understood from the Table 2, the air of city areas with heavy traffic is badly polluted by automobile exhausts containing large amounts of $NO_x$ and $SO_x$ gases. According to these data, a polluted air was artificially prepared.

An experiment for purifying the polluted air by using the apparatus of FIG. 1 placed in an experimental house was carried out. A culture fluid having the composition S1 shown in Table 1 was used in this experiment. A concentration of Spirulina in the culture fluid is 0.05 g/L. A temperature of the culture fluid is 30° C. A radiation amount of light is 4500 lux. The contents of the $NO_x$ and $SO_x$ gases in the polluted air are 0.25 ppm and 0.05 ppm, respectively. After the apparatus was operated for 24 hours, the contents of the $NO_x$ and $SO_x$ gas in a purified air were measured. Results show that the contents of the $NO_x$ and $SO_x$ gases in the purified air are 1/50 or less of those in the polluted air measured before the experiment.

TABLE 2

| Location | NOx (ppm) | SOx (ppm) |
|---|---|---|
| Osaka-Umeda Shindo | 0.098~0.128 | |
| Osaka-Yodoyabashi | | 0.017~0.049 |
| Osaka-Imazato Junction | 0.100~0.178 | |
| Osaka-Matta Junior High School | | 0.017~0.029 |
| Sakai-Sakai City Hall | 0.073~0.148 | 0.026~0.046 |
| Tokyo-Daiichi-Keihin Takawa | 0.109~0.258 | |
| Tokyo-Kitashinagawa | | 0.036~0.072 |
| Tokyo-Hibiya | 0.105~0.224 | |
| Tokyo-Kasumigaseki | | 0.019~0.045 |

What is claimed is:

1. A system for purifying a polluted air containing carbon dioxide and at least one of nitrogen oxide and sulfur oxide by using Spirulina as algae, said system comprising:

a culture tank filled with a culture fluid including said Spirulina;

an air supply means for forcing said polluted air into said culture fluid to dissolve carbon dioxide and said at least one of nitrogen oxide and sulfur oxide in said culture fluid;

a lighting means for radiating a light to said culture fluid to promote photosynthesis of said Spirulina in the presence of said carbon dioxide by the use of said at least one of nitrogen oxide and sulfur oxide as a nutrient of said Spirulina, to thereby provide a reduction of said at least one of nitrogen oxide and sulfur oxide and generation of oxygen; and filtering means for removing Spirulina of 300 μm or more from said culture fluid, and returning a filtrate including immature Spirulina smaller than 300 μm to said culture tank.

2. The system as set forth in claim 1 comprising a means for providing a transmission light passing through said culture fluid including said algae to the outside of said culture tank.

3. An apparatus for generating a purified air from a polluted air including carbon dioxide and at least one of nitrogen oxide and sulfur oxide by using Spirulina, said apparatus comprising:

a culture tank filled with a culture fluid including said Spirulina, said culture tank having an inlet for receiving a supply of said culture fluid, outlet for draining said culture fluid, and at least one air vent for escaping said purified air from said culture tank;

an air supply means for forcing said polluted air into said culture fluid to dissolve carbon dioxide and said at least one of nitrogen oxide and sulfur oxide in said culture fluid;

a lighting means disposed in said culture tank for radiating a light to said culture fluid to promote photosynthesis of said Spirulina in the presence of said carbon dioxide by the use of said at least one of nitrogen oxide and sulfur oxide as a nutrient of said Spirulina, to thereby provide a reduction of said at least one of nitrogen oxide and sulfur oxide and generation of oxygen;

a return line formed outside of said culture tank to extend from said outlet to said inlet of said culture tank;

a pump for making a circulation flow of said culture fluid such that said culture fluid drained from said outlet is returned to said inlet of said culture tank through said return line; and a filter for removing said Spirulina of 300 μm or more from said culture fluid and returning a filtrate including immature Spirulina to said culture tank.

4. The apparatus as set forth in claim 3, wherein said culture tank is provided with a plurality of partitions which forms a meander line in said culture tank.

5. The apparatus as set forth in claim 4, wherein said lighting means is disposed along said meander line in said culture tank.

6. The apparatus as set forth in claim 4, wherein said partitions consist of at least one first partition projecting on a bottom of said culture tank and at least one second partition hanging from a top of said culture tank, which are alternately arranged to make said meander line.

7. A method of purifying a polluted air containing carbon dioxide and at least one of nitrogen oxide and sulfur oxide by using Spirulina as algae, said method comprising the steps of:

forcing said polluted air into a culture fluid containing said Spirulina to dissolve carbon dioxide and said at least one of nitrogen oxide and sulfur oxide in said culture fluid;

radiating a light to said culture fluid to promote photosynthesis of said Spirulina in the presence of said carbon dioxide by the use of said at least one of nitrogen oxide and sulfur oxide as a nutrient of said Spirulina, to thereby provide a reduction of said at least one of nitrogen oxide and sulfur oxide and generation of oxygen;

filtering said culture fluid so as to remove Spirulina of 300 $\mu$m or more from said culture fluid thereby producing a filtrate including immature Spirulina smaller than 300 $\mu$m; and returning said filtrate including immature Spirulina smaller than 300 $\mu$m to said culture tank.

* * * * *